Nov. 4, 1924.
F. B. CROSBY
1,514,137
CONVEYING MECHANISM
Filed Feb. 4, 1920
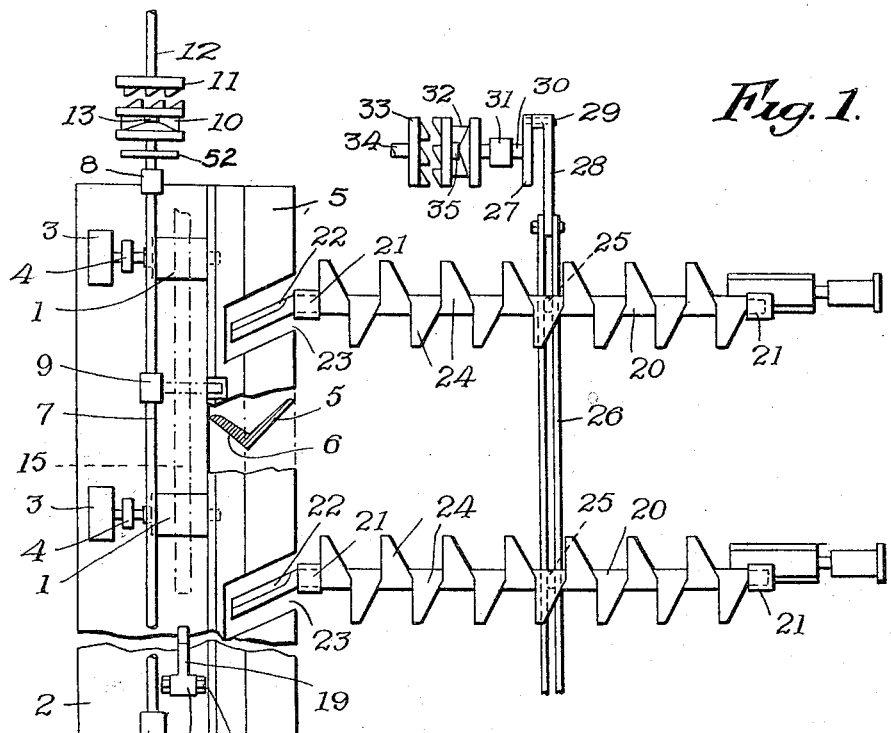
Fig. 1.
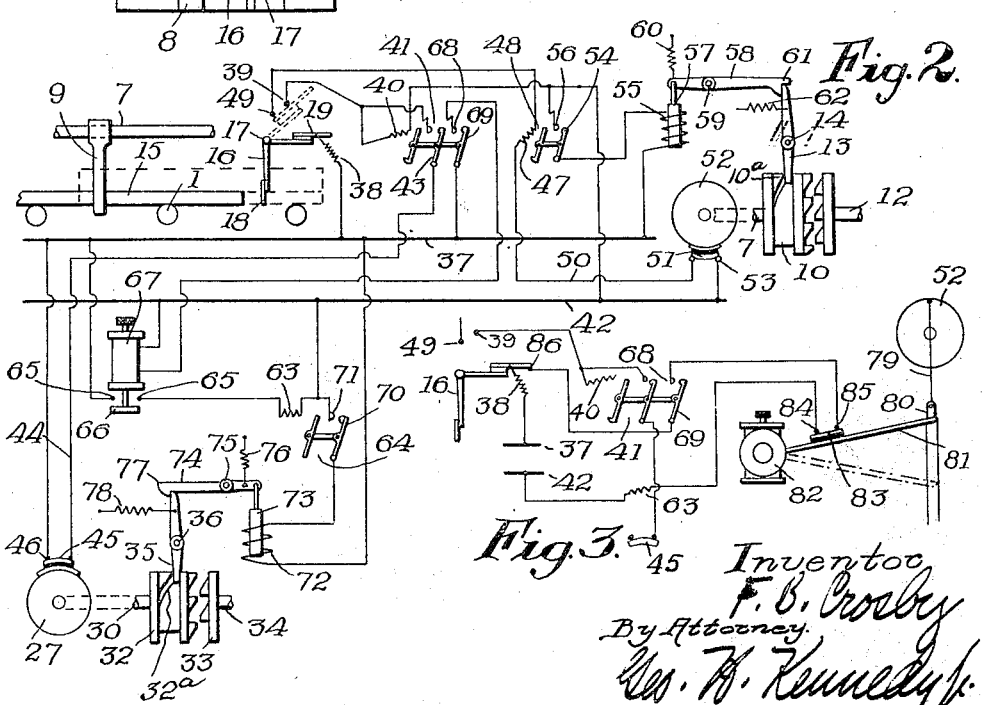
Fig. 2.
Fig. 3.
Inventor
F. B. Crosby
By Attorney
Geo. H. Kennedy Jr.

Patented Nov. 4, 1924.

1,514,137

UNITED STATES PATENT OFFICE.

FRED B. CROSBY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CONVEYING MECHANISM.

Application filed February 4, 1920. Serial No. 356,323.

*To all whom it may concern:*

Be it known that I, FRED B. CROSBY, a citizen of the United States, residing at Worcester, in the county of Worcester and Commonwealth of Massachusetts, have invented a new and useful Improvement in a Conveying Mechanism, of which the following, together with the accompanying drawings, is a specification.

My invention relates to conveying mechanisms for metal rods or bars, to be used in connection with a rolling mill for receiving and advancing the material leaving the mill, and for transferring the same to a suitable receiving mechanism, such as a cooling bed.

Such a conveying mechanism is shown in U. S. Patent No. 701,024, granted May 27, 1902, to Victor E. Edwards. The mechanism described in the above patent generally comprises a series of rolls for conveying the rods or bars longitudinally and delivering the same sidewise to a suitable runout or trough, from which the bars are transferred to a cooling bed consisting of a series of spaced inclined skids having projecting portions for arresting the downward movement of the bars. The skids are given an oscillatory movement whereby a step-by-step movement is imparted to the bars as they move sidewise down the cooling bed. Difficulties have heretofore been encountered in the use of this general type of conveying mechanism and cooling bed, due to the fact that the heated bars tend to bend at the points where they are supported by the spaced projecting portions of the skids unless they are allowed to cool off appreciably before being transferred from the rolls.

The object of my invention is to provide means for automatically arresting the movement of the rods or bars as they progress from the conveyor rolls to the cooling bed, in order that each rod may lie in an intermediate trough an appreciable time before being transferred to the first notch of the cooling bed. I also propose to provide means for automatically controlling the transferring and racking movements of the mechanism.

In the accompanying drawings,

Figure 1 is a plan view of a conveying mechanism embodying my invention.

Figure 2 is a diagrammatic view showing the general arrangement of apparatus and the electrical connections controlling the operation of the same.

Figure 3 is a diagrammatic view showing a modification in the electrical connections shown in Fig. 2.

Similar reference characters refer to similar parts in the different figures.

Referring to the drawings, the conveying mechanism generally comprises a plurality of conveyor rolls 1, rotatably mounted upon an elevated platform 2. The rolls 1 are respectively driven by any suitable means, such as electric motors 3, through gearing 4. An L-shaped trough 5 extends at right angles to the axes of the rolls 1 and is supported with the upper edge of one side 6 substantially flush with the peripheries of the respective rolls 1. A shaft 7 rotatably mounted in bearings 8, carried above the platform 2, extends parallel to the trough 5 and is provided with a plurality of spaced kick-off arms 9. The arms 9 normally extend downwardly between adjacent rolls 1 and are adapted to turn with the shaft 7, the side 6 of the trough 5 being provided with slots to permit rotation of the arms 9.

The shaft 7 is provided at one end with a movable clutching element 10 that is adapted to engage a corresponding clutching element 11 mounted at the end of a shaft 12. The shaft 12 is continuously driven from a suitable source of power, not shown. A shifting arm 13 pivotally mounted at the point 14, is adapted to move the element 10 into engagement with the element 11, and when the shaft 7 is thereby clutched to the shaft 12, the kick-off arms 9 will move upwardly toward the trough 5 from the full line position of Fig. 2 into the dotted line position shown in Fig. 1. This movement of the arms 9 will serve to remove a bar 15 from the rolls 1 to the trough 5. A trigger 16 is pivotally mounted above the rolls 1 on a shaft 17, and its lower end is provided with a plate 18 that is located in the line of movement of the bar 15, as it is advanced toward the trigger 16, by the rotation of the rolls 1. A contact arm 19 extending at an angle to the trigger 16 is adapted to turn therewith for a purpose to be hereinafter described.

The cooling bed comprises a plurality of inclined skids 20 rotatably mounted at their ends in bearings 21, and respectively provided at their upper ends with oblique wings 22, adapted to move in slots 23, provided in the trough 5, when the skids 20 are turned on their axes. Each skid 20 is provided with a series of projecting lugs 24, which are alternately arranged to extend substantially at right angles to each other in opposite directions. Each skid 20 is further provided with a downwardly extending arm 25, and all of the arms 25 are secured together by means of a link 26. The link 26 is connected to a crank disk 27, by means of a connecting rod 28, extending between the end of the link 26 and a crank pin 29 carried on the disk 27. The crank disk 27 is carried at one end of a shaft 30 rotatably mounted in a bearing 31. The other end of the shaft 30 is provided with a movable clutching element 32, adapted to engage a corresponding clutching element 33 mounted on a shaft 34 that is continuously driven from a suitable source of power, not shown. A shifting arm 35, pivotally mounted at 36, is adapted to move the element 32 into engagement with the element 33 and when the shaft 30 is thereby clutched to the shaft 34, rotation of the same will cause a reciprocating motion of the link 26. This movement of the link 26 will in turn cause an oscillatory movement of the skids 20 through the arms 25. When the skids 20 are so oscillated, the wings 22 will move upwardly in the slots 23 and will transfer the bar 15 from the trough 5 to the first series of lugs 24. Subsequent oscillations of the skids 20 will cause the bar to travel down the cooling bed with a step-by-step movement as it engages alternate series of lugs 24.

The contact arm 19 is permanently connected to a supply main 37 through a flexible conductor 38. When the trigger 16 is moved from its lower position, by an advacing bar 15, the contact arm 19 is adapted to engage a contact member 39 which is connected to one terminal of the closing coil 40 of a two-point contactor 41. The other terminal of the coil 40 is permanently connected to a supply main 42. When the contactor 41 is closed by energization of coil 40, one contact arm 43 thereof, provides an interlock for the closing coil 40 through the conductor 44, a bridging member 45 carried on the disk 27, and a contact member 46 connected to the supply main 37. One terminal of the closing coil 47 of a one-point contactor 48 is connected through a contact member 49 that is also located in the path of movement of the contact arm 19. The other terminal of coil 47 is connected to main 42 through a conductor 50, a bridging member 51 carried on a disk 52, rotatable with the shaft 7, and a contact member 53.

The contact arm 54 of the contactor 48 is connected to one terminal of the energizing coil 55 of a solenoid, the other terminal of which is connected to the supply main 37. The contact member 56 that is engaged by the contact arm 54 is connected to the supply main 42. The plunger 57 of the solenoid is pivotally connected to one end of a lever 58 pivotally mounted at the point 59. The lever 58 is normally held away from the solenoid by a spring 60 when the coil 55 is de-energized. The other end of the lever 58 is provided with a projection 61, which serves to maintain the shifting arm 13 in a substantially vertical position against the action of a spring 62, which tends to turn the arm about its pivot. In the vertical position, the shifting fork 13 holds clutching elements 10 and 11 out of engagement with each other.

One terminal of the closing coil 63 of a one-point contactor 64 is connected permanently to the main 42 and the other terminal thereof is connected to one of two contact members 65 that are adapted to be bridged by the contact bar 66 of a relay 67 when it is in its closed position. The relay 67 is of the dash-pot type and is adapted to close a predetermined time interval after being energized irrespective of ordinary variations in the applied voltage. The time interval may be adjusted. One terminal of the relay 67 is connected to the main 42 and the other terminal to the main 37 through the stationary contact member 68 and the arm 69 of contactor 41. The contact arm 70 of the contactor 64 is adapted to engage a contact member 71 which is connected to the main 42. The contact arm 70 is connected to one terminal of the energizing coil 72 of a solenoid, the other terminal of which is permanently connected to the main 37. The plunger 73 of the solenoid is connected to one end of a lever 74, pivotally mounted at the point 75. The lever is held away from the solenoid by a spring 76 when the coil 72 is de-energized. The other end of the lever 74 is provided with a projection 77 that is adapted to hold the shifting arm 35 in a substantially vertical position against the action of a spring 78 which tends to move the clutching elements 32 and 33 into engagement with each other.

Having thus described the various parts entering into my invention, the operation thereof is as follows:—When the bar 15 is advancing over the rolls 1, the parts occupy the positions shown, that is, with the contactor 41 open and the shafts 12 and 34 running free. When the bar 15 has almost reached the last roll 1, its advancing end engages the plate 18 of the trigger 16, and moves it to the right about its pivot 17. When this occurs, the contact arm 19 is moved into the position shown in dotted lines, in which it engages the contact members 39 and 49. The movement of the contact arm 19 completes the circuit of the closing coil 40 at the contact member 39 and the contactor 41 closes. As soon as the contact arm 19 engages the contact member 49, the closing coil 47 is energized, thereby closing the contactor 48. The closing of the contact arm 54 energizes the coil 55 of the solenoid, whereupon the plunger 57 is attracted and draws the end of the lever 58 downward against the action of the spring 60. This movement of the lever 58 releases the upper end of the shifting arm 13 from the projection 61, whereupon the spring 62 moves the shifting arm about its pivot, thereby causing the shaft 7 to be clutched to the shaft 12 through engagement of the clutching elements 10 and 11. The disk 52 then starts to turn with the shaft 7 in a clockwise direction and the bridging member 51 is disengaged from the contact member 53, thereby breaking the circuit of the coil 47 and allowing the contactor 48 to open. The continued rotation of the shaft 7 causes the push-off arm 9 to move upwardly and remove the bar 15 from the rolls 1. After the push-off arm 9 has removed the bar from the rolls, the shaft 7 continues to turn until it has completed substantially one revolution. At this point the clutching elements 10 and 11 are moved out of engagement by any suitable means, such as a cam device 10$^a$ co-operating with the arm 13 and the shaft 7 comes to rest. As the arm 13 is moved by the cam, it raises the end of the lever 58 until the projection 61 again engages the top of the arm and prevents its movement by the spring 62. In this way the shaft 7 is allowed to make only one complete revolution, thereby returning the kick-off arms 9 to their original position to remove the next bar advancing over the rolls.

The exact form of the device for disengaging the clutching elements 10 and 11 after the shaft 7 has made one complete revolution forms no part of the present invention, and as such devices are well known in the art, it is not believed necessary to further describe the same herein.

As soon as the bar 15 has been removed, the trigger 16 returns to its original position, but the contactor 41 remains closed through the interlock provided by the bridging member 45. The closing of the contactor 41 completes the circuit of the relay 67 upon the engagement of the contact arm 69 with its contact 68, and the relay 67 starts to close at a very slow rate, as compared with the closing of contactor 48. The exact time that it will take the bar 66 to bridge the contact members 65 is determined by the setting of the dash-pot and this in turn depends upon how long it is desired to keep the bar 15 in the trough 5 before transferring it to the first step of the cooling bed. This time interval may be adjusted to meet various requirements, depending upon the size and degree of heating of the bar 15.

When the contact bar 66 finally engages the contact members 65, it completes the closing circuit of the coil 63 of the contactor 64. The closing of the contact arm 70 thereupon energizes the coil 72 and attracts the plunger 73. The resulting movement of the lever 74 releases the shifting arm 35 from the projection 77 and allows the spring 78 to move the shifting arm and cause engagement of the clutching elements 32 and 33. This clutches the shaft 30 to the driving shaft 34, and the crank disk 27 starts to turn. The movement of the crank disk 27 is transmitted to the skids 20 through the connecting rod 28 and link 26, whereupon the wings 22 are shifted upwardly to remove the bar 15 from the trough 5 to the first series of projections 24.

As soon as the crank disk 27 starts to turn, the bridging member 45 moves off the contact member 46 and thereby breaks the interlock circuit of the closing coil 40 and allows the contactor 41 to open. Just as the crank disk 27 completes one revolution the clutching elements are disengaged by any suitable means, such as a cam device 32$^a$ cooperating with the arm 35 and the shaft 30 comes to rest, the cam device 32$^a$ operating in the same manner as the cam device 10$^a$. This movement of the arm 35 lifts the lever 74 and allows the projection 77 to again lock the arm 35 against the spring 78.

From the foregoing, it is apparent that every time an advancing bar 15 moves the trigger 16, the bar is removed from the rolls by the kick-off arms 9. The bar is then automatically allowed to lie in the bottom of the trough 5 an appreciable time until it has cooled enough to permit its removal to the cooling bed. As the skids 20 are permitted to make only one complete oscillation each time that a bar engages the trigger 16, it is apparent that the bars move down the cooling bed at a very slow rate with a step-by-step motion. The intervals between the separate oscillations of the skids 20 are substantially the same as the time interval of the dash-pot relay 67. In this way the transfer of the bars from the rolls to the trough and the travel of the bars down the cooling bed will proceed with a slow measured movement, so that there is no possibility of the material piling up in the trough 5 or becoming congested on the cooling bed. The delay in the trough 5 also increases the capacity of the cooling bed by one notch, Referring now to Fig. 3, there is shown a modification in the arrangement of the apparatus, like reference characters denoting like parts in Figs. 2 and 3. When the bar 15 engages the trigger 16, the contact arm 19 engages the contact member 39 and completes the circuit of the closing coil of the contactor 41, as before. Engagement with contact member 49 also causes energization of the coil 55 and allows the shifting arm 13 to clutch the shaft 7 to the motor shaft 12, and turn the disk 52 through one complete revolution, as before. The disk 52 is provided with a connecting rod 79 attached to a slide 80 which engages the free end of the arm 81 of a dash-pot 82. The arm is provided with a contact plate 83 adapted to bridge contact members 84 and 85, which are in circuit with the closing coil 63, the contact arm 69 and an auxiliary contact member 86 adapted to be engaged by the contact arm 19 in its lower position.

When the disk 52 makes one complete revolution, the arm 81 is moved to the position shown in dotted lines, by the slide 80 and then is free to return to its original position at a rate dependent upon the time element of the dash-pot 82. The time interval is adjustable through a wide range, as with the dash-pot relay 67. By the time the contact plate 83 engages the contact members 84 and 85, the bar 15 has been removed from the rolls 1 and the contact arm 19 is in its original position in engagement with the auxiliary contact 86. Bridging of the contacts 84 and 85 thereupon completes the circuit of the closing coil 63 which in turn causes the shaft 30 to be clutched to the shaft 34 to oscillate the skids 20, as previously described.

From the above described operation, it is apparent that with either arrangement of apparatus, the length of time that the rod will lie in the trough 5 before being transferred to the cooling bed can be very closely adjusted by means of the dash-pot relay 67 or the dash-pot 82. Once the dash-pot has been set to give the proper time interval, the whole mechanism works automatically and with absolute uniformity both with regard to the length of time that the bar is delayed and its rate of movement down the cooling bed. The advantage to be gained by the use of the mechanically operated dash-pot 82 lies in the fact that its closing is entirely independent of any variations in the voltage across the supply mains 37 and 42. In some rolling mill installations, it is quite possible that extreme voltage fluctuations might render the use of an electrically operated dash-pot undesirable, in which case the mechanically operated dash-pot could be employed, as shown in Fig. 3, with but a few small changes in the connections of the apparatus.

In addition, the automatic control and co-ordination of the movements of the push-off and racking mechanisms, whereby a definite time interval in the transfer of the bars is obtained, insures a uniform product from the mill. The certainty with which the amount of cooling of the bars may be controlled substantially eliminates all possibility of distorting or bending the same during the passage down the cooling bed, so that it is not necessary to perform any expensive straightening operations thereon after the bars are cold.

While I have shown my invention as applied to a particular type of cooling bed it is obvious that it is not so limited, but may as well be applied to other cooling beds of the same general type, and with different arrangement of apparatus for accomplishing the same purpose. I desire therefore that only such limitations be imposed thereon as may come within the scope of the appended claims.

I claim:

1. In a mechanism of the class described, a plurality of rolls for moving a bar longitudinally, a cooling bed for moving a bar sidewise, and means set in motion by longitudinal movement of the bar for transferring the bar from the rolls to the cooling bed with an automatically controlled delayed action.

2. In a mechanism of the class described, a plurality of rolls for moving a bar longitudinally, a cooling bed for moving a bar sidewise, means controlled by the movement of the bar along the rolls for automatically initiating a transfer of the bar from the rolls to the cooling bed, and means for automatically causing a delay in the transfer of the bar.

3. In a mechanism of the class described, a plurality of rolls for moving a bar longitudinally, a cooling bed for moving a bar sidewise, means controlled by the movement of the bar along the rolls for initiating a transfer of the bar from the rolls to the cooling bed, and means for automatically causing a definite time interval to occur in the transfer of the bar.

4. In a mechanism of the class described, a plurality of rolls for moving a bar longitudinally, a cooling bed for moving a bar sidewise, a support interposed between the rolls and the bed, and means for automatically causing the bar to lie on the support a definite time interval while being transferred from the rolls to the cooling bed.

5. In a mechanism of the class described, a plurality of rolls for moving a bar longitudinally, a cooling bed for moving a bar sidewise, a support interposed between the rolls and the bed, means operable by the movement of the bar along the rolls for initiating a transfer of the bar from the rolls to the cooling bed, and means for automatically causing the bar to lie on the support a predetermined time interval during its movement from the rolls to the bed.

6. In a mechanism of the class described, a plurality of rolls for moving a bar longitudinally, a cooling bed for moving a bar sidewise, a support interposed between the rolls and the bed, means for transferring the bar from the rolls to the support, means for transferring the bar from the support to the bed, and means for automatically coordinating the operation of the said transferring means to cause the bar to pause on the support during its movement from the rolls to the cooling bed.

7. In a mechanism of the class described, a plurality of rolls for moving a bar longitudinally, a cooling bed for moving a bar sidewise, a support interposed between the rolls and the bed, means for transferring the bar from the rolls to the support, means for transferring the bar from the support to the bed, and means for automatically delaying the operation of the second named transferring means following the operation of the first named transferring means.

8. In a mechanism of the class described, the combination with a series of rolls for moving bars longitudinally, a cooling bed for moving the bars sidewise, and means controlled by longitudinal movement of the bars for transferring bars from the rolls to the cooling bed, of means for automatically causing each bar to pause during its movement from the rolls to the bed.

9. In a mechanism of the class described, the combination with a series of rolls for moving bars longitudinally, a cooling bed for moving the bars sidewise, and means for transferring bars from the rolls to the cooling bed, of means dependent upon movement of the bars by the rolls for causing each bar to pause during its movement from the rolls to the bed.

10. In a mechanism of the class described, the combination with means for supporting and moving a bar longitudinally, and a cooling bed for moving a bar sidewise, of means set in motion by longitudinal movement of a bar for transferring a bar from the supporting means to the cooling bed with an automatically controlled delayed action.

11. In a mechanism of the class described, the combination with means for supporting a bar longitudinally, and a cooling bed for moving a bar sidewise, of means for delivering a bar to the supporting means, and means for transferring said bar from the supporting means to the cooling bed with an automatically controlled time interval between the delivery and transferal of said bar.

12. In a mechanism of the class described, the combination with means for supporting a bar longitudinally, and a cooling bed for moving a bar sidewise, of means for delivering a bar to the said supporting means, means for transferring a bar from the supporting means to the cooling bed, and means for automatically causing a bar to remain on said supporting means a definite time interval between its deposit thereon by said delivery means and its removal therefrom by said transfer means.

Dated this 29th day of January, 1920.

FRED B. CROSBY.

Witnesses:
NELLIE WHALEN,
PENELOPE COMBERBACH.